US012795548B2

United States Patent

(12) Abbas et al.

(10) Patent No.: US 12,795,548 B2

(45) Date of Patent: Nov. 10, 2026

(54) METHOD OF POWER SAVING FOR WTRU TO NETWORK RELAY

(71) Applicant: InterDigital Patent Holdings, Inc., Wilmington, DE (US)

(72) Inventors: Taimoor Abbas, Sainte-Julie (CA); Xiaoyan Shi, Lake Oswego, OR (US); Samir Ferdi, Kirkland (CA); Michelle Perras, Montreal (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 196 days.

(21) Appl. No.: 18/690,655

(22) PCT Filed: Oct. 7, 2022

(86) PCT No.: PCT/US2022/046052

§ 371 (c)(1), (2) Date: Mar. 8, 2024

(87) PCT Pub. No.: WO2023/059882

PCT Pub. Date: Apr. 13, 2023

(65) Prior Publication Data

US 2024/0389027 A1 Nov. 21, 2024

Related U.S. Application Data

(60) Provisional application No. 63/324,361, filed on Mar. 28, 2022, provisional application No. 63/253,921, filed on Oct. 8, 2021.

(51) Int. Cl.

| | |
|---|---|
| ***H04W 52/02*** | (2009.01) |
| ***H04W 12/37*** | (2021.01) |
| *H04W 88/04* | (2009.01) |

(52) U.S. Cl.

CPC ....... *H04W 52/0235* (2013.01); *H04W 12/37* (2021.01); *H04W 88/04* (2013.01)

(58) Field of Classification Search

CPC . H04W 52/0235; H04W 12/37; H04W 88/04; H04W 12/06; H04W 12/106;

(Continued)

(56) References Cited

U.S. PATENT DOCUMENTS

| | | | | |
|---|---|---|---|---|
| 2014/0112194 A1* | 4/2014 | Novlan | ................ | H04W 76/14 370/254 |
| 2020/0100088 A1* | 3/2020 | Kim | ...................... | H04W 48/16 |

(Continued)

FOREIGN PATENT DOCUMENTS

WO WO 2022/150538 A1 7/2022

OTHER PUBLICATIONS

3rd Generation Partnership Project, "Add relay related handling to direct link management procedures", OPPO, C1-215624, 3GPP TSG-CT WG1 Meeting #132-e, Oct. 11-15, 2021, 11 pages.

(Continued)

*Primary Examiner* — Afshawn M Towfighi

(74) *Attorney, Agent, or Firm* — Flaster Greenberg P.C.

(57) ABSTRACT

Methods and apparatuses for power saving are described herein. A method performed by a remote wireless transmit/receive unit (WTRU) may include receiving a broadcast message indicating a power saving capability, sending, to a relay WTRU, a request for direct communication, receiving an acknowledgement from the relay WTRU in response to the request for direct communication, and establishing a link to the relay WTRU based on the received acknowledgement.

(Continued)

The method may further include sending, to the relay WTRU, a message for registration with a network, receiving, via the relay WTRU, a message from the network in response to the message for registration, sending, to the relay WTRU, a message indicating that a power saving feature is enabled, and adjusting parameters for power saving. The request for direct communication may include information indicating one or more power saving capabilities or power saving requirements of the remote WTRU.

20 Claims, 13 Drawing Sheets

(58) Field of Classification Search
CPC ..... H04W 76/14; H04W 76/23; H04W 76/25; H04W 76/28; H04W 92/18; H04W 52/0229; H04W 52/0209; H04L 63/123; H04L 63/1466; Y02D 30/70
See application file for complete search history.

(56) References Cited

U.S. PATENT DOCUMENTS

2020/0296665 A1* 9/2020 Huang .............. H04W 52/0209
2021/0352767 A1* 11/2021 Paladugu .............. H04W 88/04

OTHER PUBLICATIONS

3rd Generation Partnership Project, "Technical Specification Group Services and System Aspects; System Architecture for the 5G System (5GS), Stage 2 (Release 17)", 3GPP TS 23.501 V17.0.0, Mar. 2021, 312 pages.
3rd Generation Partnership Project, "Technical Specification Group Services and System Aspects; Procedures for the 5G System (5GS); Stage 2 (Release 17)", 3GPP TS 23.502 V17.0.0, Mar. 2021, 646 pages.
3rd Generation Partnership Project, "Technical Specification Group Services and System Aspects; Proximity based Services (ProSe) in the 5G System (5GS) (Release 17)", 3GPP TS 23.304 V2.0.0, Sep. 2021, 99 pages.

* cited by examiner

100

METHOD OF POWER SAVING FOR WTRU TO NETWORK RELAY

CROSS-REFERENCE TO RELATED APPLICATION

This application is the 371 National Stage of International Application No. PCT/US2022/046052, filed Oct. 7, 2022, which claims priority to U.S. Provisional Patent Application No. 63/324,361, filed Mar. 28, 2022, and to U.S. Provisional Patent Application No. 63/253,921, filed in the United States of America on Oct. 8, 2021, the entire contents of each of which are incorporated herein by reference.

BACKGROUND

Massive Internet of Things (IoT) equipment may consume large amounts of power while only communicating small amounts of data and communicating infrequently. Therefore, Fifth Generation (5G) systems may introduce power saving enhancements to reduce power consumption and to extend battery lifetimes of IoT devices. For example, the IoT device may use extended Discontinuous Reception (DRX) for CM-Idle and Radio Resource Control (RRC) inactive status to decrease paging occasions monitored by the IoT device in a period. Also, an IoT device may use a Mobile Initiated Connection Only (MICO) mode to avoid monitoring paging. The MICO mode may work with an Extended Connected Time (which may indicate how long the Radio Access Network (RAN) will keep IoT device in connected mode), active time (which may indicate how long the IoT device will operate in MICO mode after the IoT device enters CM-Idle) and/or a Periodic Registration Timer Control (which may indicate when the IoT device is to perform registration procedure for oncoming downlink (DL) data). The IoT device may negotiate the extended DRX and/or MICO mode with the network during a registration procedure.

SUMMARY

Methods and apparatuses for power saving are described herein. A method performed by a remote wireless transmit/receive unit (WTRU) may include receiving a broadcast message indicating a power saving capability, sending, to a relay WTRU, a request for direct communication, receiving an acknowledgment from the relay WTRU in response to the request for direct communication, and establishing a link to the relay WTRU based on the received acknowledgement. The method may further include sending, to the relay WTRU, a message for registration with a network, receiving, via the relay WTRU, a message from the network in response to the message for registration, sending, to the relay WTRU, a message indicating that a power saving feature is enabled, and adjusting parameters for power saving. The request for direct communication may include information indicating one or more power saving capabilities or power saving requirements of the remote WTRU.

In examples, where the Remote WTRU is an IoT device, the Remote WTRU's power consumption requirements may be considered. A Layer-2 Remote WTRU may negotiate with the network to enable extended DRX and/or MICO feature however, extended DRX and/or MICO may be available (e.g. only available) in Uu interface, e.g., between the Layer-2 Remote WTRU and the network. For the PC5 interface, for example, between the Remote WTRU and the WTRU-to-Network Relay, the Remote WTRU may need to monitor and/or maintain the PC5 connection(s) by e.g., sending keep-alive and/or Link Identifier Update messages, even in the absence of any message/data forwarded from the network to the Remote WTRU (e.g., via the PC5 interface).

A Remote WTRU may obtain WTRU-to-Network Relay's power saving capability during the U2N Relay discovery and/or PC5 link establishment. The Remote WTRU may select a U2N Relay based on, for example, U2N's power saving capability. The Remote WTRU may inform the U2N Relay that the power saving is activated, for example, when entering CM-Idle state. The U2N Relay and/or Remote WTRU may adjust, and/or stop/pause maintenance timers (e.g. keep-alive timer).

A WTRU may comprise a processor and memory, wherein the processor and memory are configured to send a message to a relay WTRU. The message may indicate a request that the relay WTRU relays communications between the WTRU and a network. The processor and/or memory may be further configured to receive a power savings configuration from the network. In examples, the WTRU may negotiate the enablement of power saving feature(s) (e.g., eDRX and/or MICO). The processor and/or memory may be further configured to send (e.g., an indication) to the relay WTRU that the WTRU is operating in a power savings mode for the WTRU's communications with the network. The processor and/or memory may be further configured to adjust and/or stop a sidelink maintenance timer associated with sidelink communications between the WTRU and relay WTRU based on, for example, sending the indication.

In examples, a WTRU may include sidelink keep alive messages that are not exchanged with the relay WTRU, for example, while a sidelink maintenance timer is stopped. In examples, the sidelink maintenance timer may include a keep alive timer. In examples, when the keep alive timer is stopped, no keep alive messages may be exchanged.

In examples, a WTRU may include a processor and/or memory that are further configured to send discontinuous reception (DRX) information and/or mobile initiated connection only (MICO) information to the relay WTRU. Additionally or alternatively, a WTRU may include a processor and/or memory that are configured to adjust a sidelink communication schedule with the relay WTRU based on the DRX and/or MICO information. In examples, a WTRU may inform the Relay about eDRX and/or MICO being enabled on the WTRU, for example, as an indication (e.g., enabled/disabled). The Remote WTRU may adjust one or more maintenance timers and/or other communication, for example, if eDRX and/or MICO are enabled.

In examples, a WTRU may include a processor and/or memory that are further configured to select the relay WTRU as a relay based on the relay WTRU indicating that the relay WTRU supports remote WTRUs that operate in power savings mode. In examples, the relay WTRU may advertise the service(s) the relay WTRU supports. Additionally or alternatively, the relay WTRU may advertise the relay WTRU's capability(ies) to support the Remote WTRUs (e.g., Remote WTRUs which use power saving feature(s)). The WTRU may listen to the advertisements from the Relays and/or select a Relay that supports one or more power saving feature(s).

In examples, a WTRU may include a processor and/or memory that are further configured to receive a discovery message from the relay WTRU. The discovery message may indicate power saving capability(ies) of the relay WTRU.

In examples, a WTRU may include a processor and/or memory that are further configured to determine that the WTRU should operate in the power savings mode based on the power saving capability(ies) of the relay WTRU. The power savings mode may comprise an extended DRX mode and/or a MICO mode. The WTRU may not operate in power saving mode, for example, if the relay does not support the feature. The power saving mode at the WTRU may be disabled, for example, if the relay does not support the feature.

In examples, a WTRU may include a processor and/or memory that are further configured to enter a CM-Idle mode when in the power savings mode.

In some embodiments, a WTRU-to-Network Relay's power saving capabilities may be received, and/or indicated, during a discovery or PC5 link establishment. For example, in some embodiments, the Remote WTRU may obtain a WTRU-to-Network Relay's power saving capability during the WTRU-to-Network Relay discovery procedure or PC5 link establishment procedure. A Remote WTRU may inform the WTRU-to-Network Relay that the power saving is activated, for example, after the Remote WTRU enters CM-Idle state. The WTRU-to-Network Relay may adjust, and/or stop/pause one or more maintenance timers (e.g. keep-alive timer) used for sidelink maintenance procedures. The Power saving indication may include extended an DRX cycle, MICO indication, and/or other indications.

In some embodiments, a remote WTRU may receive one or more available DRX cycle(s) and/or available time windows from the surrounding Relays, for example, during the discovery procedure. A Remote WTRU may select a Relay based on extended DRX (e.g., advertised extended DRX) and/or one or more available time windows and/or local application requirement. The Remote WTRU may send a requested time windows and/or DRX to the Relay during PC5 link establishment. The Remote WTRU may send one or more available time windows to the network. The Remote WTRU may schedule data delivery based on one or more available time windows.

In some embodiments, a Remote WTRU may receive DRX cycles and/or time windows from the network (e.g., over the established link via the U2N Relay). A Remote WTRU may send the Remote WTRU's preferred DRX cycle to the Relay (e.g., using PC5 Link Modification Request). A Remote WTRU may receive Link Modification Accept (e.g., indicating an agreed DRX cycle). The enablement of eDRX and/or MICO may be negotiated with the network. Additionally or alternatively, some examples may include other information (e.g., DRX cycles and/or time windows) indicating when to listen to the network and/or when reception/transmission may be done).

In some embodiments, a WTRU may comprise a processor and memory, wherein the processor and memory are configured to send a message to a relay WTRU, wherein the message comprises a Relay Service Code (RSC) and a power saving capabilities of the WTRU. In some embodiments, the WTRU may receive a Direct Security Mode (DSM) command message from the relay WTRU. In some embodiments, the WTRU may send a DSM complete message to the relay WTRU, wherein the DSM complete message comprises a power saving policy of the WTRU. In some embodiments, the WTRU may receive a power saving configuration from the relay WTRU, wherein the power savings configuration indicates an agreed upon power saving policy. In some embodiments, a WTRU may activate the power saving configuration for communication with the relay WTRU.

In some embodiments, the message may comprise a Direct Communication Request (DCR) message.

In some embodiments, the power saving capabilities of the WTRU may indicate whether the WTRU supports a Mobile Initiated Connection Only (MICO) mode or an extended Discontinuous Reception (eDRX) mode.

In some embodiments, the DSM command message may comprise (e.g., an indication) of the power saving capability(ies) of the WTRU.

In some embodiments, the power saving policy may indicate a requested power saving mode or one or more power saving timer values.

In some embodiments, the requested power saving mode may comprise MICO mode and/or eDRX mode.

In some embodiments, the power saving configuration may be received in a DCA message.

In some embodiments, the agreed upon power saving policy may comprise (e.g., an indication) that MICO mode and/or eDRX mode will be used.

In some embodiments, the processor and memory may be further configured to exchange one or more PC5 link messages with the relay WTRU (e.g., according to the saved power saving configuration).

In some embodiments, the processor and memory may be further configured to receive updated power saving parameters from a network. In some embodiments, the processor and memory may be further configured to initiate a link modification procedure with the relay WTRU, for example, to request an updated power saving configuration based on the updated power saving parameters.

In some embodiments, the power saving policy may indicate an initial power saving mode and/or an initial power saving timer value. In some embodiments, the updated power saving parameters may comprise an updated power saving mode and/or an updated power saving timer value. In some embodiments, the processor and memory may be further configured to initiate the link modification procedure with the relay WTRU, for example, based on the initial power saving mode and/or the initial power saving timer value.

In some embodiments, the DSM command message may be integrity protected to prevent man-in-the-middle attacks. In some embodiments, the DSM complete message may be integrity protected to prevent man-in-the-middle attacks. In some embodiments, the power saving configuration may be integrity protected to prevent man-in-the-middle attacks.

A method performed by a remote WTRU may comprise sending a message to a relay WTRU. The message may indicate a request that the relay WTRU relays communications between the WTRU and a network. The method may further comprise receiving a power savings configuration from the network. The method may further comprise sending an indication to the relay WTRU that the WTRU is operating in a power savings mode for the WTRU's communications with the network. The method may comprise adjusting and/or stopping a sidelink maintenance timer associated with sidelink communications between the WTRU and relay WTRU based on sending the indication.

The method may further comprise sidelink keep alive messages not being exchanged with the relay WTRU, for example, while a sidelink maintenance timer is stopped.

The method may further comprise sending discontinuous reception (DRX) information and/or mobile initiated connection only (MICO) information to the relay WTRU. The method may further comprise adjusting a sidelink communication schedule with the relay WTRU based on the DRX and/or MICO information.

The method may further comprise selecting the relay WTRU as a relay based on the relay WTRU indicating that the relay WTRU supports remote WTRUs that operate in one or more power savings mode(s).

The method may further comprise receiving a discovery message from the WTRU. The discovery message may indicate power saving capability of the relay WTRU.

The method may further comprise selecting the relay WTRU based on the power saving capability of the relay WTRU indicated by the discovery message.

The method may further comprise determining that the WTRU should operate in the power savings mode based on the power saving capability of the relay WTRU.

The method may further comprise the power savings mode including an extended DRX mode and/or a MICO mode.

The method may further comprise entering a CM-Idle mode when, for example, in the power savings mode.

The method may further comprise the power savings configuration including a DRX configuration and/or a MICO configuration.

A method may be perform (e.g., by a WTRU, such as a remote WTRU) to configure power savings configurations with a relay WTRU. For example, the method may further comprise sending a message to a relay WTRU, wherein the message may comprise a Relay Service Code (RSC) and/or power saving capabilities of the WTRU.

The method may further comprise receiving a Direct Security Mode (DSM) command message from the relay WTRU.

The message may further comprise sending a DSM complete message to the relay WTRU, wherein the DSM complete message may comprise a power saving policy of the WTRU.

The method may further comprise receiving a power saving configuration from the relay WTRU, wherein the power savings configuration may indicate an agreed upon power saving policy.

The method may further comprise activating the power savings configuration for communication with the relay WTRU.

The method may further comprise the power savings capabilities of the WTRU indicating whether the WTRU supports a Mobile Initiated Connection Only (MICO) mode and/or an extended Discontinuous Reception (eDRX) mode.

The method may further comprise the DSM command message comprising (e.g., an indication) of the power saving capability(ies) of the WTRU.

The method may further comprise the power saving policy indicating a requested power saving mode or one or more power saving timer values, wherein the requested power saving mode may comprise MICO mode and/or eDRX mode.

The method may further comprise the agreed upon power saving policy comprising (e.g., an indication) that MICO mode and/or eDRX mode will be used.

The method may further comprise storing the power saving configuration with a PC5 link context.

The method may further comprise exchanging one or more PC5 link messages with the relay WTRU (e.g., according to the saved power saving configuration).

The method may further comprise receiving updated power saving parameters from a network.

The method may further comprise initiating a link modification procedure with the relay WTRU to request an updated power saving configuration based on the updated power saving parameters.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
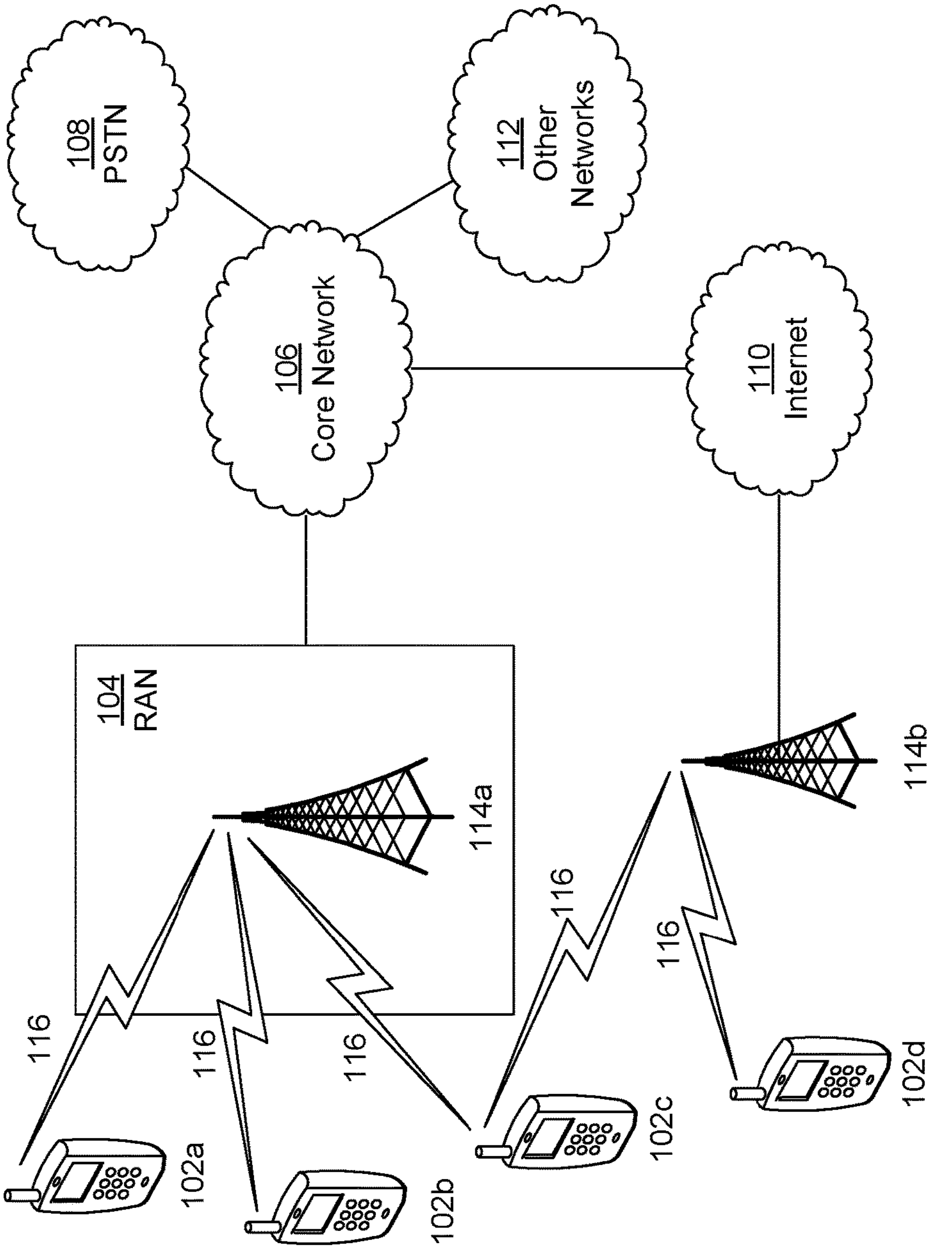
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
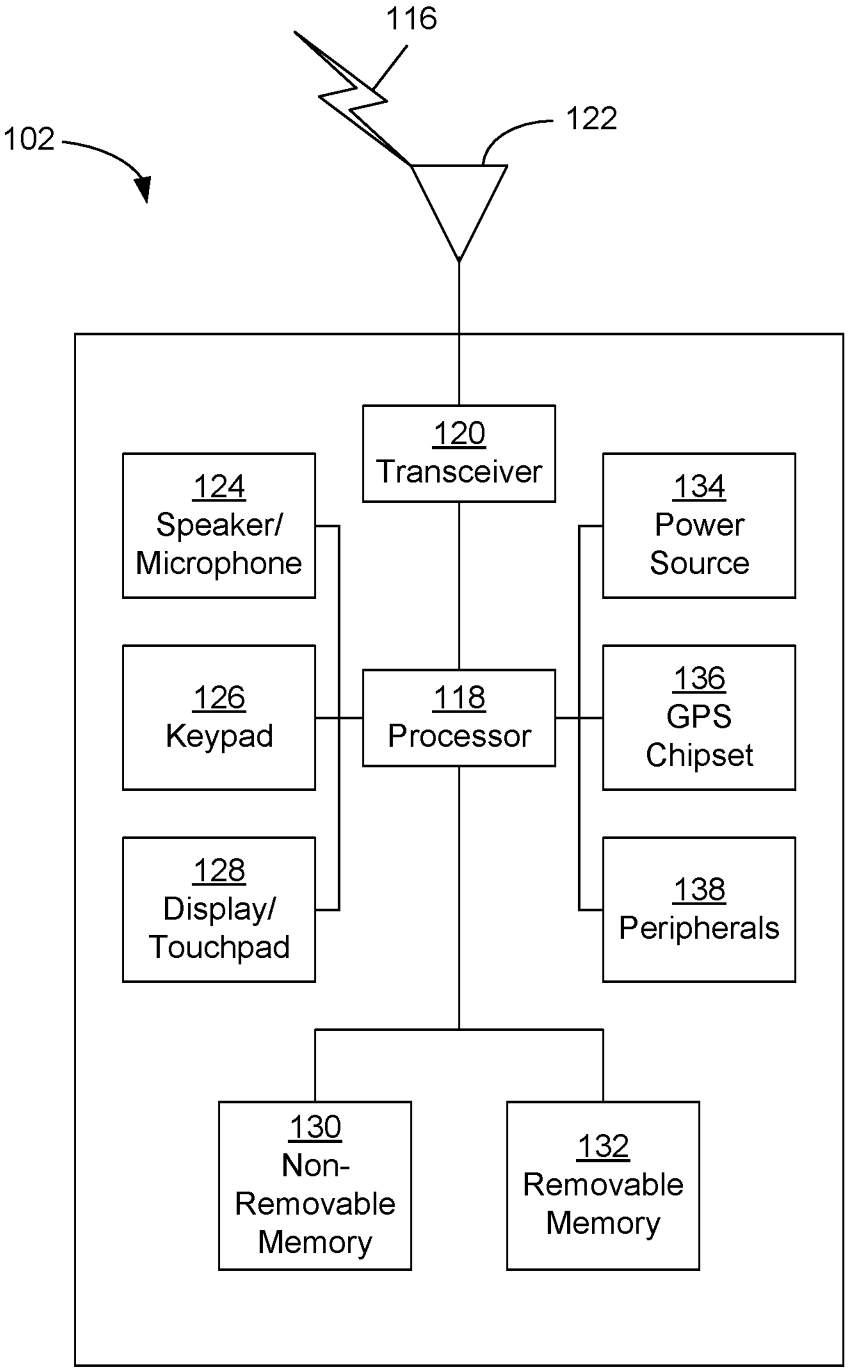
FIG. 1B is a system diagram illustrating an example wireless transmit/receive unit (WTRU) that may be used within the communications system illustrated in FIG. 1A according to an embodiment.
Figure 1C:
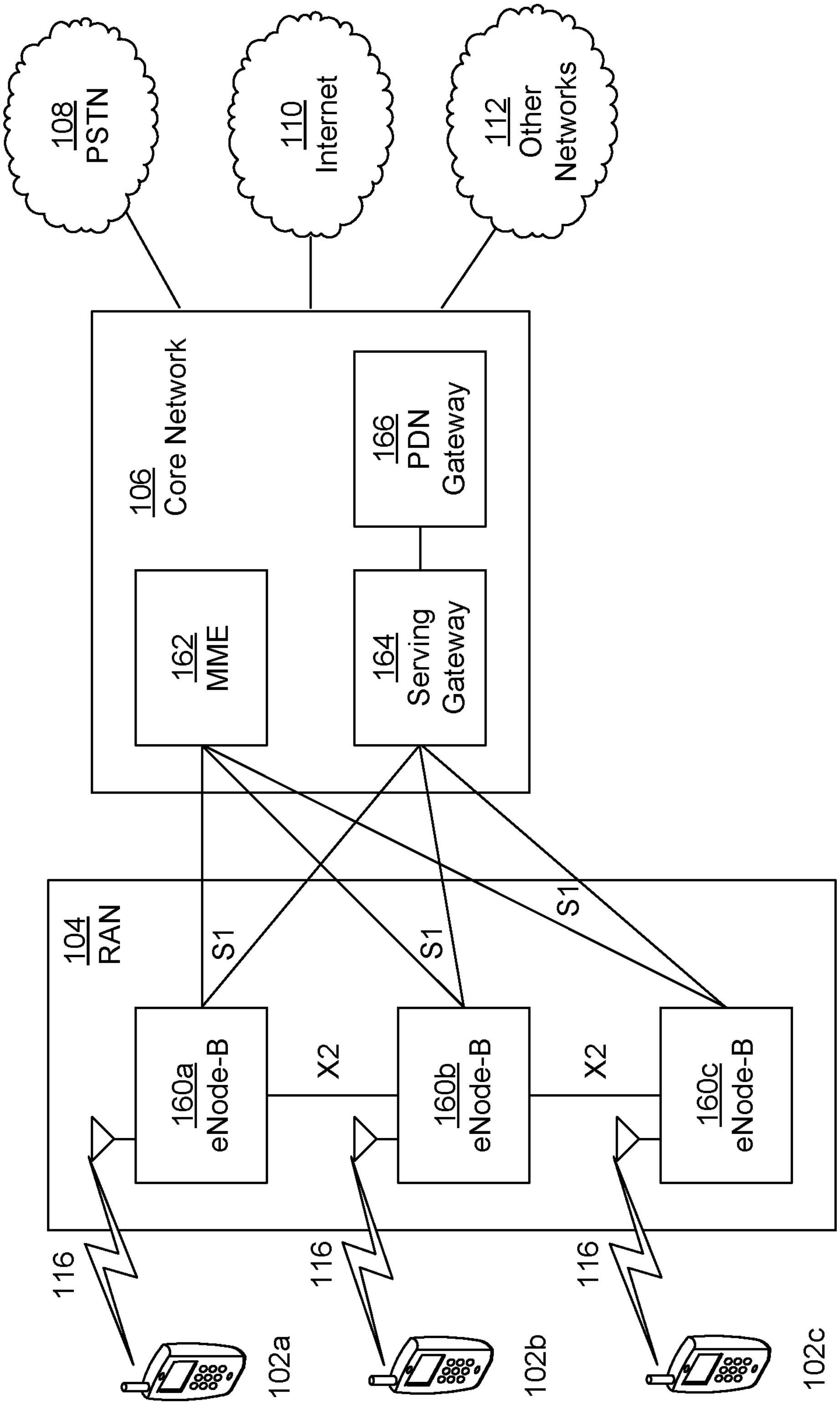
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
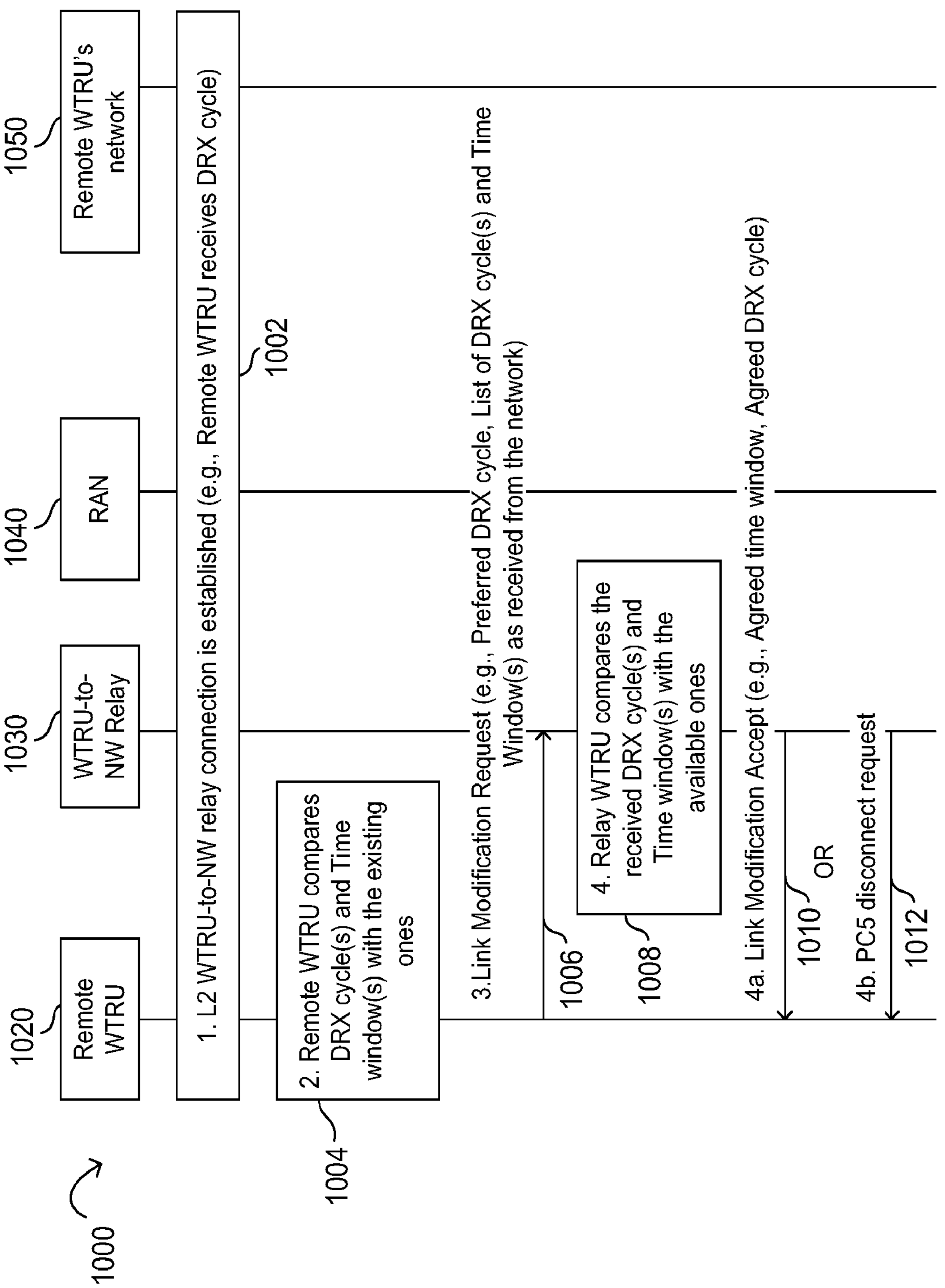
FIG. 10 illustrates an example of Layer 2 WTRU-to-Network Relay discontinuous reception (DRX) cycle alignment.

FIG. 10 is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
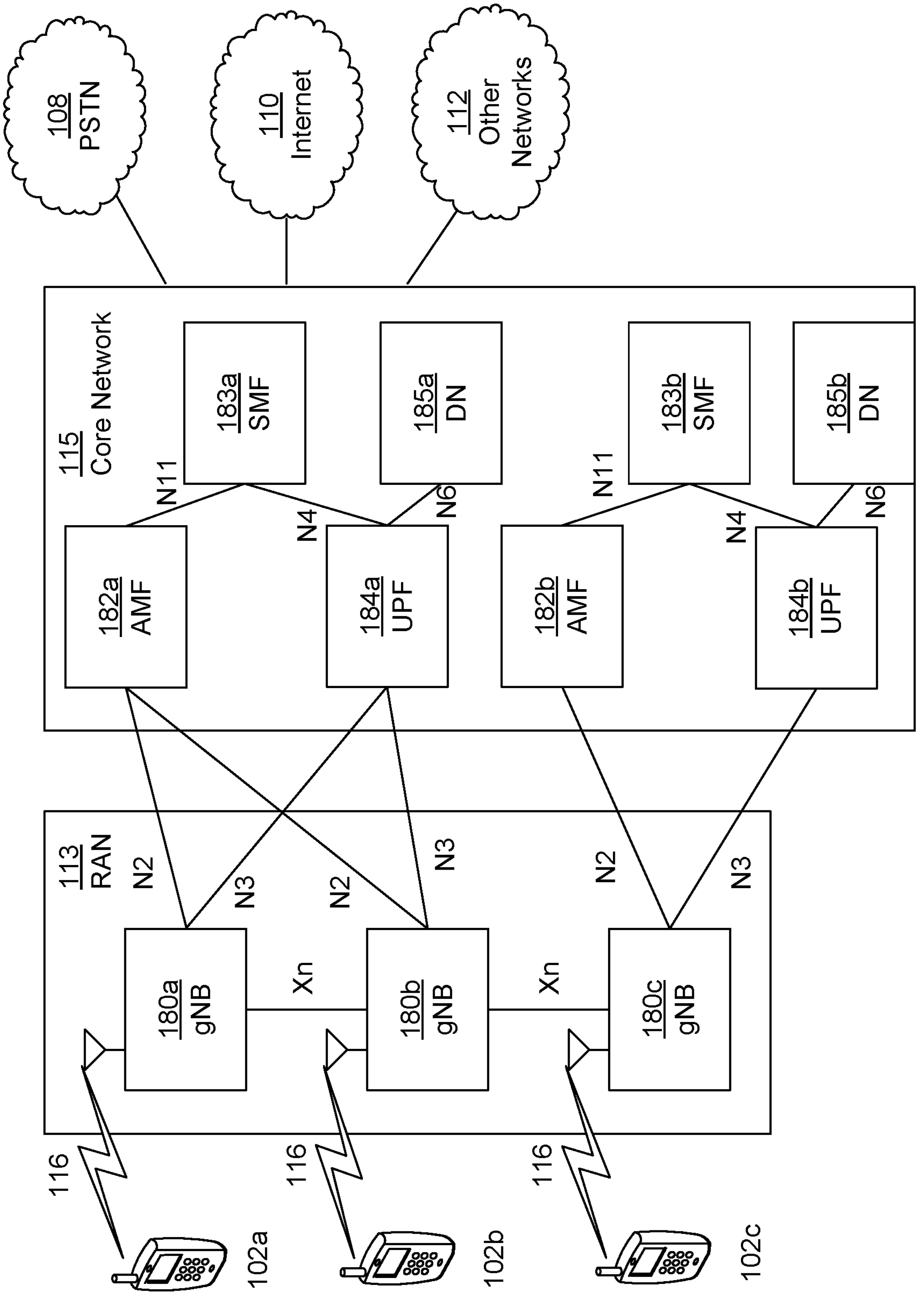
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

References models of a Fifth Generation (5G) network may be described herein. It should be understood from the following that reference to layers utilized by the network, e.g., layers pertaining to certain types of messages, entities, or other network participants, actors, or components may be conceptual in nature, and the following disclosure should not limit an association of such messages, entities, or other network participants, actors, or components with any particular layer. For example, it should be understood that the function of a layer-2 or MAC layer message may conceivably be provided by an RRC message or other logical equivalents.

The terms "WTRU-to-NW Relay" and "WTRU-to-NW Relay WTRU" may be used interchangeably throughout the application and, for example, my reference to a WTRU that is configured to operate as a relay to one or more networks nodes for another WTRU.

Figure 2:
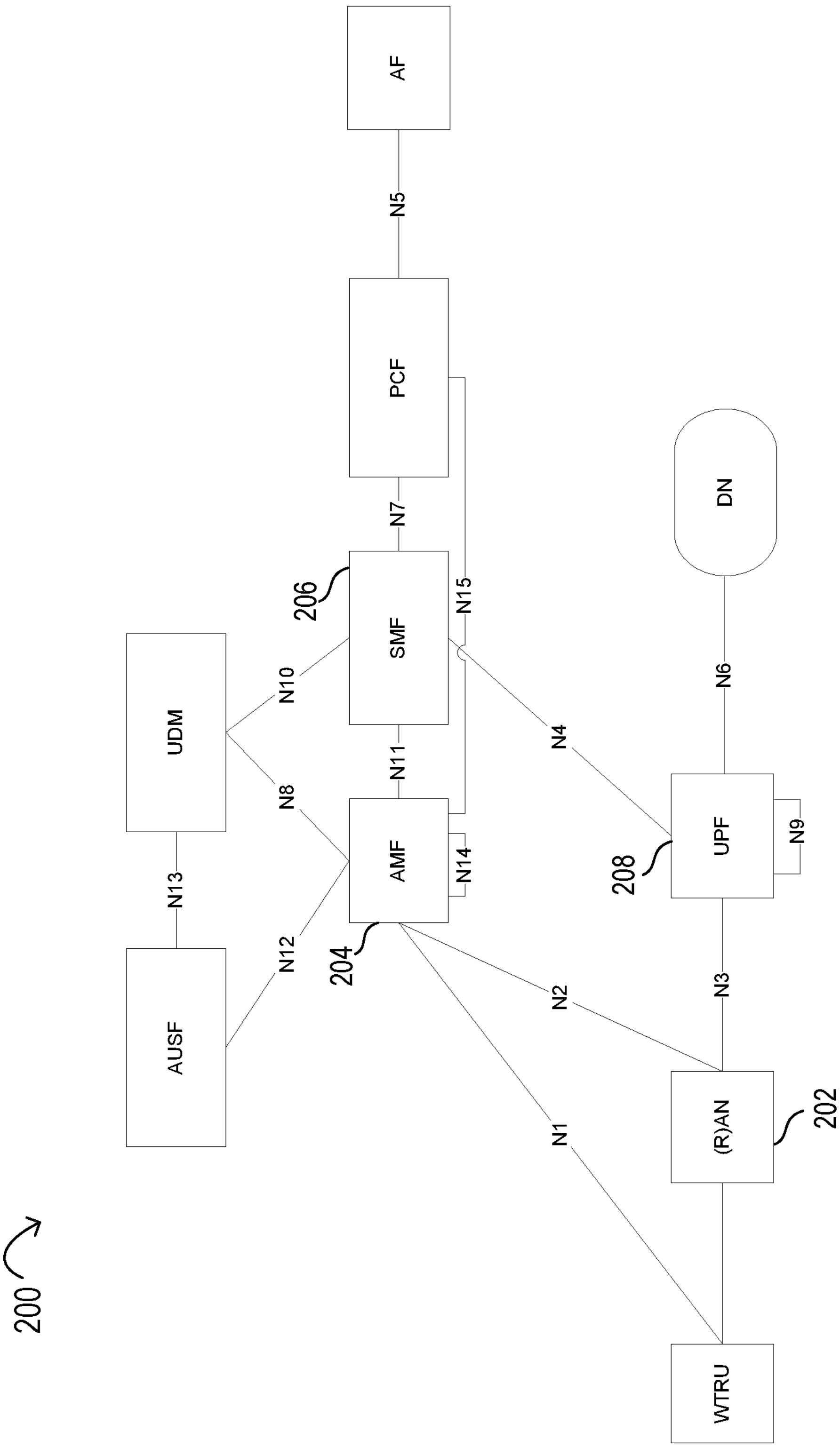
FIG. 2 illustrates a reference Model of a 5G/NextGen Network according to some embodiments.

FIG. 2 illustrates a reference Model of a 5G/NextGen Network according to some embodiments. A RAN 202 described herein may refer to a radio access network based on, for example, a 5G Radio Access Technology (RAT) and/or Evolved Universal Mobile Terrestrial Telecommunications System Terrestrial Radio Access (E-UTRA) that connects to the NextGen core network.

An Access Control and Mobility Management Function (AMF) 204 may have one or more of the following functionalities: registration management, connection management, reachability management, and/or mobility management, among others.

The Session Management Function (SMF) 206 may have one or more of the following functionalities: session management (including session establishment, modify and release), WTRU IP address allocation, and/or selection and control of UP function, among others.

The User Plane Function (UPF) 208 may have one or more of the following functionalities: packet routing & forwarding, packet inspection, and/or traffic usage reporting, among others.

A ProSe WTRU-to-Network Relay according to one or more embodiments is described herein. The ProSe WTRU-to-Network Relay entity may provide functionality to support connectivity to the network for Remote WTRUs.

A Remote WTRU may discover and select a ProSe WTRU-to-Network Relay, for example, if a Remote WTRU is out of New Radio (NR) coverage and cannot communicate with the network directly (or is in NR coverage but prefers to use relayed PC5 interface for communication). the Remote WTRU may establish a PC5 session with the ProSe WTRU-to-Network Relay and/or accesses the network via the ProSe WTRU-to-Network Relay.

A Layer-2 WTRU-to-Network Relay according to one or more embodiments is described herein. The Layer-2 WTRU-to-Network Relay may provide functionality to support connectivity to the network for Layer-2 Remote WTRUs via AS layer forwarding.

Figure 3:
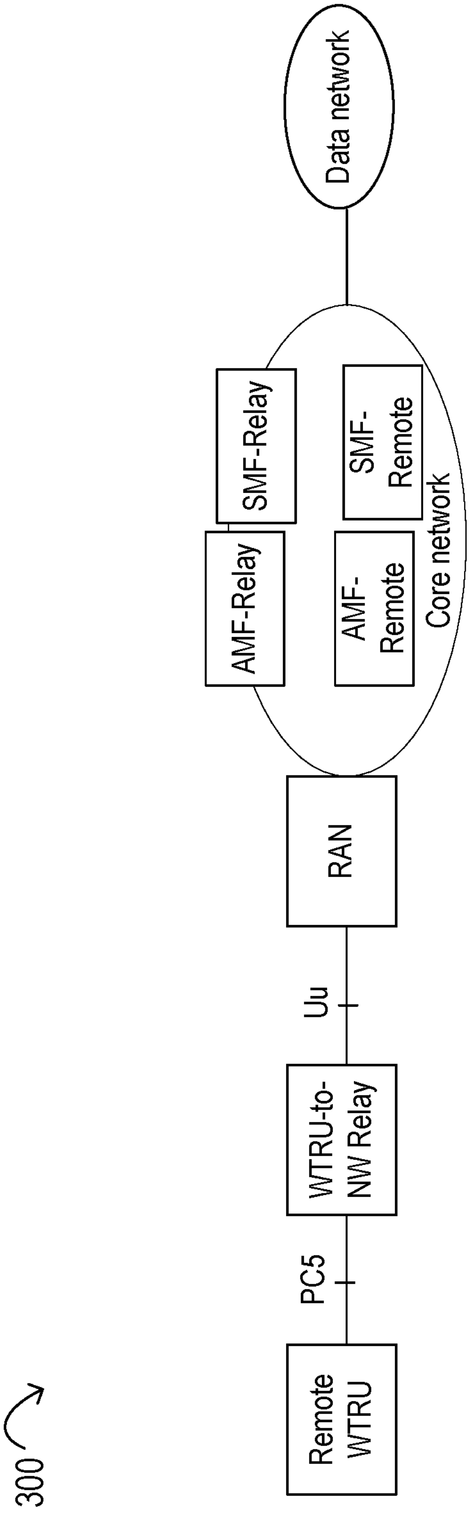
FIG. 3 illustrates an example of an architecture model using a Layer-2 WTRU-to-Network Relay.

FIG. 3 illustrates an example of an architecture model using a Layer-2 WTRU-to-Network Relay.

Figure 4:
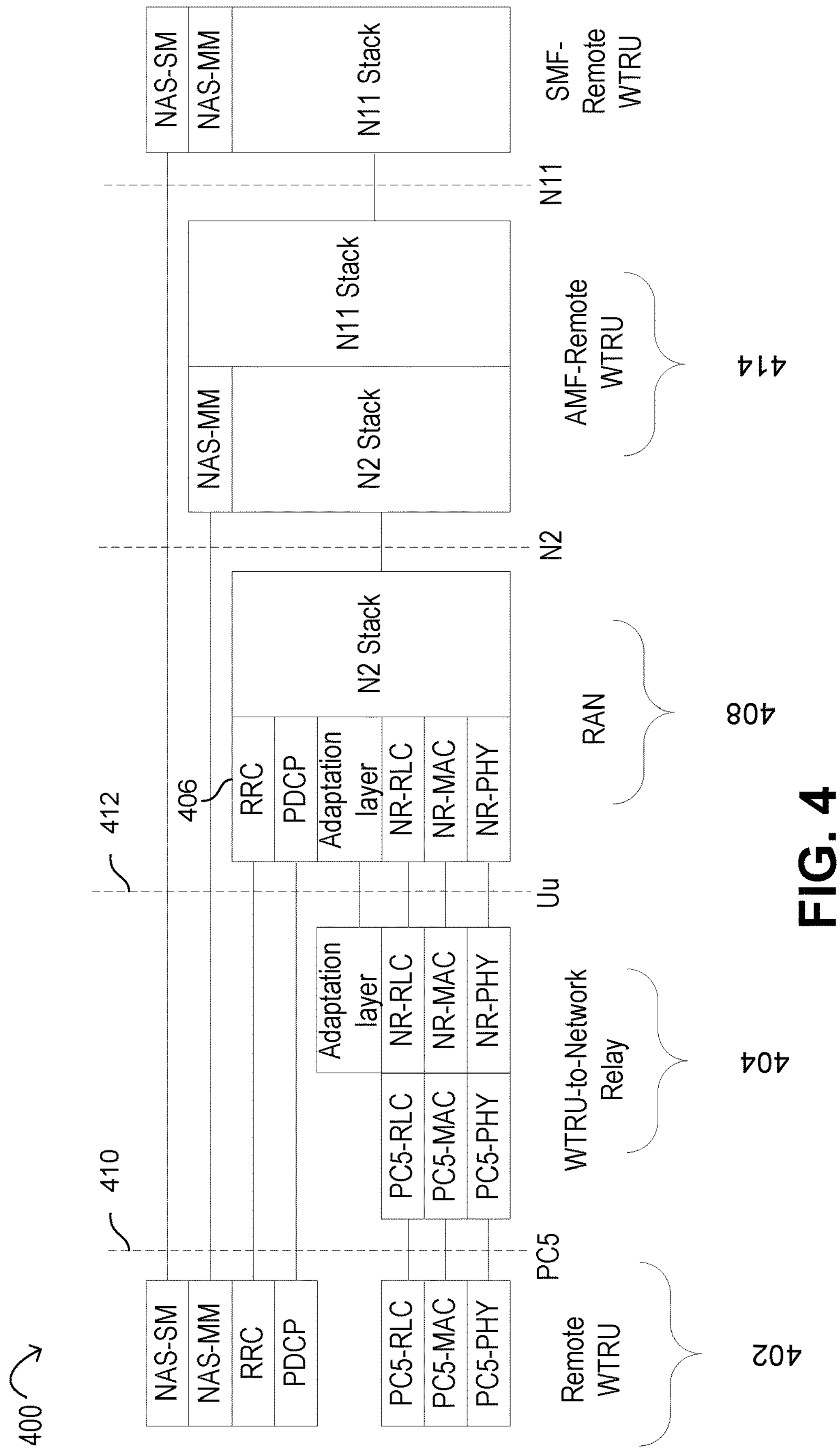
FIG. 4 illustrates an End-to-End Control Plane for a Remote WTRU using a Layer-2 WTRU-to-Network Relay.

FIG. 4 illustrates an example of an End-to-End Control Plane for a Remote WTRU using a Layer-2 WTRU-to-Network Relay. A Layer-2 WTRU-to-Network Relay 404 may forward RRC signaling and traffic 406 between the Layer-2 Remote WTRU 402 and the RAN 408, for example, after a PC5 session 410 is established between the Layer-2 Remote WTRU 402 and Layer-2 WTRU-to-Network Relay 404. When receiving a signaling over a Uu interface 412, the RAN 408 may determine whether the signaling received is from WTRU-to-Network relay 404 itself or from the Remote WTRU 402 via the WTRU-to-network relay 404.thehe RAN 408 may perform corresponding procedures with the AMF-Relay (which may serve the WTRU-to-Network Relay) or AMF-Remote WTRU 414 (which may serve the Remote WTRU 402). The AMF-Relay and AMF-Remote WTRU 414 may belong to different core networks. In order to provide AS layer forwarding, the Layer-2 WTRU-to-Network Relay 404 may remain in connected mode if any Layer-2 Remote WTRU 402 is in connected mode.

A Layer-3 WTRU to Network Relay according to one or more embodiments is described herein. The Layer-2 WTRU-to-Network Relay may provide the functionality to support connectivity to the network for Layer-2 Remote WTRUs via IP layer forwarding.

Figure 5:
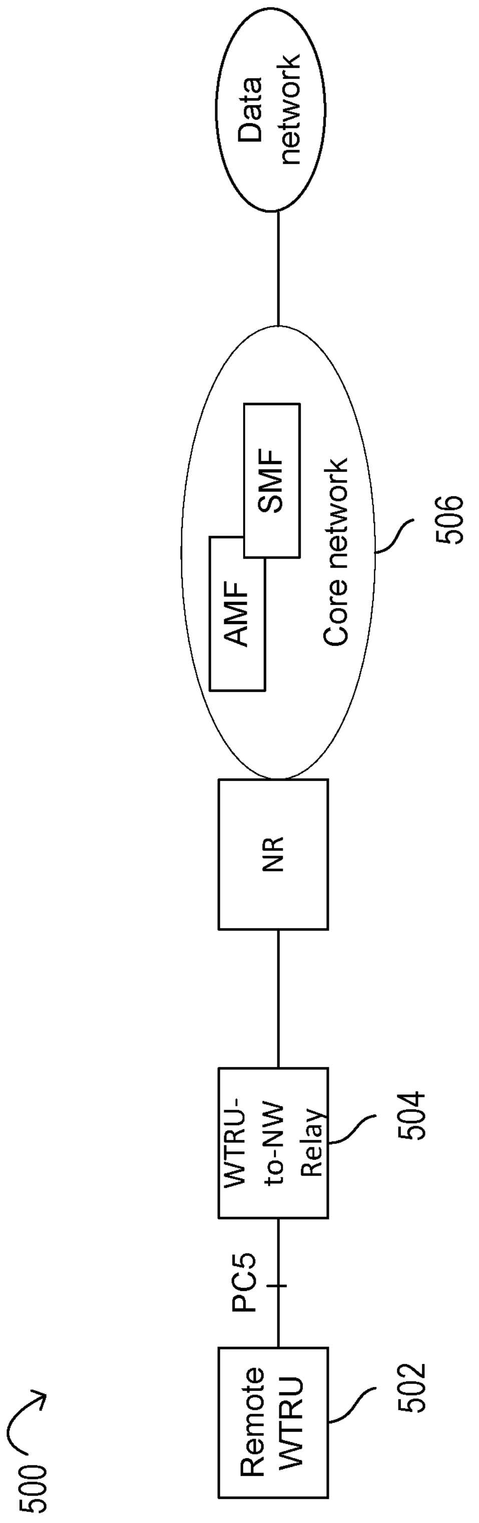
FIG. 5 illustrates an example of an architecture model using a Layer-3 WTRU-to-Network Relay.

FIG. 5 illustrates an example of an architecture model using a Layer-3 WTRU-to-Network Relay. A Layer-3 WTRU-to-Network Relay 504 may establish a new PDU session and/or modify an existing PDU session to provide connectivity between a Layer-3 Remote WTRU 502 and/or the core network 506, for example, after a PC5 session is established between the Layer-3 Remote WTRU 502 and Layer-3 WTRU-to-Network Relay 504. A Layer-3 WTRU-to-Network Relay 504 may allocate an IP address/prefix to the Layer-3 Remote WTRU 502, for example, if an IP type PDU session is established for the Layer-3 Remote WTRU 502. The Layer-3 Remote WTRU 502 may use the IP connection to access the internet and/or access back to Layer-3 Remote WTRU's core network 506.

Power saving for Remote WTRUs may be one problem addressed by one or more of the embodiments disclosed herein. Consider a Remote WTRU's power consumption requirements may be necessary, for example, when the Remote WTRU is an IoT device. For example, a Layer-2 Remote WTRU may negotiate with a Layer-2 Remote WTRU's network to enable extended DRX and/or MICO features. However, both extended DRX and MICO may be (e.g., only be) available over a Uu interface, e.g., between the Layer-2 Remote WTRU and the network. Over a PC5 interface, e.g., between the Layer-2 Remote WTRU and the Layer-2 WTRU-to-Network Relay, the Remote WTRU may still need to keep monitoring PC5 signaling (e.g., periodically, at all time) and/or maintain the PC5 connections by, for example, sending keep-alive message and/or Link Identifier Update message, even in the absence of any message/data forwarded from the network to the Layer-2 Remote WTRU (e.g., via PC5 interface).

Figure 6:
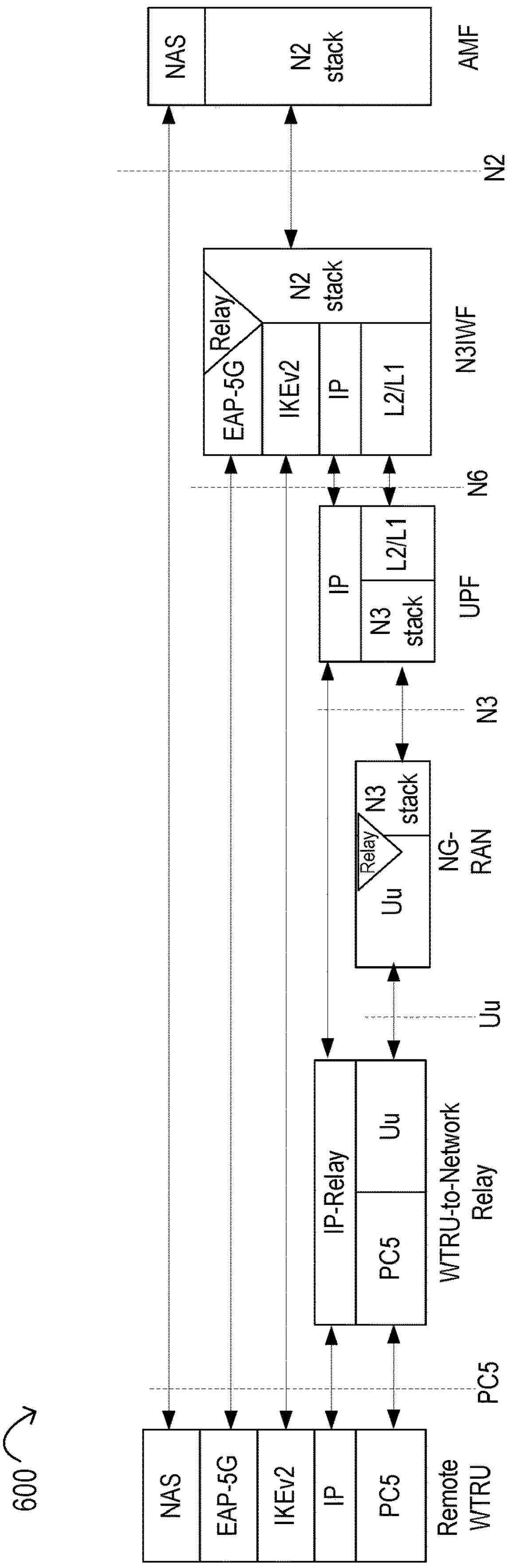
FIG. 6 illustrates an example of an End-to-End Control Plane for a Remote WTRU using Layer-3 WTRU-to-Network Relay.

FIG. 6 illustrates an example of an End-to-End Control Plane for a Remote WTRU using Layer-3 WTRU-to-Network Relay.

Described herein, by one or more of the embodiments, may be how to enable a Remote WTRU's power saving, for example, when a Remote WTRU has enabled extended DRX/MICO modes with the network and/or when the Remote WTRU accesses the network (e.g., via a WTRU-to-Network Relay).

Power saving for WTRU-to-Network Relays may be a problem addressed by one or more of the embodiments disclosed herein. When the WTRU-to-Network Relay is an IoT device, as described herein, the WTRU-to-Network Relay's power consumption requirements may be considered. For example, there may be multiple Remote WTRUs accessing the network via a WTRU-to-Network Relay. The multiple Remote WTRUs may use different extended DRX modes (e.g., in Layer-2 WTRU-to-Network Relay case), which may cause the WTRU-to-Network relay to consume more power to monitor a Remote WTRU's paging, for example, if the Remote WTRU's extended DRX is shorter than the WTRU-to-Network Relay's DRX.

Additionally or alternatively, the Remote WTRUs may send/receive data via WTRU-to-Network relay in different time windows, which may cause the WTRU-to-Network relay to change frequently between the CM-idle and CMconnected status and/or keep connected status for longer time, which may also increase the power consumption of the WTRU-to-Network Relay.

A question that may be addressed by one or more of the embodiments described herein may be how to enable a WTRU-to-Network's power saving, for example, when there are multiple Remote WTRUs accessing the network via a WTRU-to-Network Relay.

Layer 2 (L2) WTRU-to-Network Relay discontinuous reception (DRX) cycle alignment may be performed. A Remote WTRU may receive DRX cycle parameter(s) from the network, for example, when a Remote WTRU has established a connection with a network via 5G ProSe L2 WTRU-to-network relay. The network may transmit DRX information to the Remote WTRU, which may be transparent to the L2 WTRU-to-Network relay (e.g., the DRX cycle between the Remote WTRU and/or the network may not be known to the relay). The DRX cycle for the PC5 connection between the Remote WTRU and the WTRU-to-Network relay WTRU may be (e.g., properly) aligned with the DRX cycle between the relay WTRU and the network (e.g., over the Uu) interface. For example, L2 WTRU-to-Network relay WTRU awareness of the DRX cycle that is assigned to the remote WTRU by the network may be enabled to ensure (e.g., proper) alignment of DRX cycles assigned over PC5 and Uu.

The terms Relay WTRU, WTRU-to-Network Relay, WTRU-to-NW Relay may be used interchangeably herein.

Various embodiments directed to power saving for Remote WTRUs may be described herein. The solutions proposed herein may address one or more of the problems described herein.

In some embodiments, a WTRU-to-Network Relay's power saving capabilities may be received, and/or indicated, during a discovery or PC5 link establishment. For example, in some embodiments, the Remote WTRU may obtain a WTRU-to-Network Relay's power saving capability during the WTRU-to-Network Relay discovery procedure and/or PC5 link establishment procedure. A Remote WTRU may inform the WTRU-to-Network Relay that the power saving is activated, for example, after the Remote WTRU enters CM-Idle state. The WTRU-to-Network Relay may adjust, and/or stop/pause one or more maintenance timers (e.g., keep-alive timer) used for sidelink maintenance procedures. The Power saving indication may include an extended DRX cycle, MICO indication, and/or other indications.

In some embodiments, the WTRU-to-Network Relay may broadcast the WTRU-to-Network Relay's power saving capability in discovery procedures (e.g., via an Announcement and/or Solicitation Response message) and/or PC5 link establishment procedures (e.g., via a Direct Communication Ack message). The power saving capability may indicate support of longer sidelink maintenance timers (e.g., or Support of extended DRX), support of stopping sidelink maintenance timers (e.g., or support of MICO), and/or other capabilities.

In some embodiments, a Remote WTRU may send information indicating the Remote WTRU's power saving requirements/capabilities in the Solicitation message and/or the Relay WTRU may reply with Solicitation Response (e.g., including relay power saving capability, available time window(s) and/or DRX cycles) if (e.g., or only if) the Relay WTRU supports the Remote WTRU capabilities. Additionally or alternatively, the Relay WTRU may reply with a Solicitation Response even if the Relay WTRU doesn't support the Remote WTRU's requirements (e.g., power saving capability) and/or indicate it in the Solicitation Response (e.g., a "no power saving capability" indication).

In some embodiments, the Remote WTRU may select a WTRU-to-Network Relay based on, for example, a WTRU-to-Network Relay's power saving capability.

In some embodiments, the Remote WTRU may determine whether to enable extended DRX and/or MICO modes with a network based on, for example, the WTRU-to-Network Relay's capability. For example, the Remote WTRU may enable MICO with a network when the WTRU-to-Network Relay supports a power saving capability.

In some embodiments, the Remote WTRU may adjust, pause and/or stop maintenance timers used for link maintenance procedures, for example, after sending power saving activated indication and/or after receiving one or more acknowledgements from a WTRU-to-Network Relay.

In some embodiments, the Remote WTRU may inform the WTRU-to-Network Relay that power saving is deactivated, for example, if the Remote WTRU decides to deactivate a power saving feature. The WTRU-to-Network Relay may adjust back and/or resume the keep-alive timer used for link maintenance procedures, for example, according to the deactivated indication.

A Remote WTRU's behavior according to one or more embodiments may be described herein. A Remote WTRU may receive a WTRU-to-Network Relay's power saving capability (e.g., an indication related to MICO, DRX, available DRX cycle and/or Available time windows), for example, during the discovery procedure and/or PC5 link establishment procedure. The Remote WTRU may select a WTRU-to-Network Relay based on WTRU-to-Network Relay's power saving capability, for example, if the Remote WTRU obtains a WTRU-to-Network Relay's power saving capability during a discovery procedure. The Remote WTRU may determine whether to enable Extended DRX and/or MICO with the network. The Remote WTRU may negotiate an Extended DRX and/or MICO with network during Registration procedure. The Remote WTRU may indicate to the WTRU-to-Network Relay that power saving is activated, for example, after entering CM-Idle. Additionally or alternatively, the Remote WTRU may receive an acknowledgement message from a WTRU-to-Network Relay indicating that power saving is activated. The Remote WTRU may adjust, pause and/or stop maintenance (e.g., keep-alive) timers based on, for example, activated power saving feature(s) and/or stop monitoring a PC5 link.

A WTRU-to-Network Relay's behavior according to one or more embodiments may described herein. A WTRU-to-Network Relay may indicate the WTRU-to-Network Relay's WTRU power saving capability(ies) during the discovery procedure and/or PC5 link establishment procedure. The WTRU-to-Network Relay may receive an indication from the Remote WTRU that the power saving is activated. The WTRU-to-Network Relay may send an Ack message to the Remote WTRU (e.g., about power saving activation). The WTRU-to-Network Relay may adjust, pause and/or stop maintenance (e.g. keep-alive) timers based on, for example, an activated power saving feature.

A description of one example of an overall procedure may be described herein.

Figure 7:
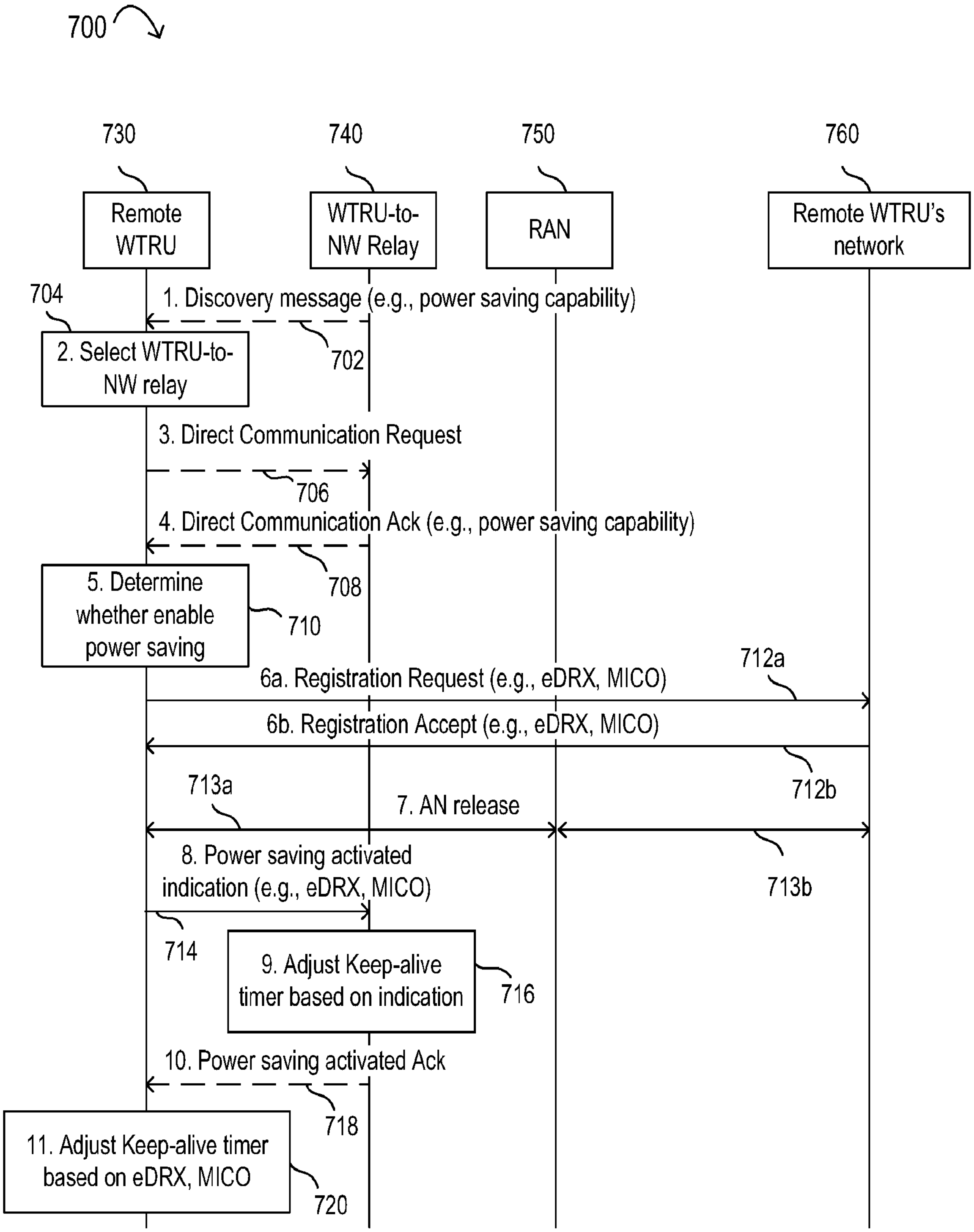
FIG. 7 illustrates an example of a ProSe WTRU-to-Network Relay's behavior according to some embodiments.

FIG. 7 illustrates an example of a ProSe WTRU-to-Network Relay's behavior according to some embodiments. As shown, a Remote WTRU 730 may receive a discovery message at 702 (e.g., power saving capability) from the WTRU-to-Network Relay 740 (e.g., step 1). For example, the Remote WTRU 730 may discover the WTRU-to-Network Relay 740 capabilities during PC5 Discovery and/or PC5 Link establishment. The Remote WTRU 730 may select a WTRU-to-Network Relay 740 at 704 based on the WTRU-to-Network Relay's 740 power saving capability (e.g., step 2).

The Remote WTRU 730 may send a message to the WTRU-to-Network Relay 740. The message may indicate (e.g., include) a request that the WTRU-to-Network Relay 740 relays communications between the Remote WTRU 730 and the network 760 (e.g., the Remote WTRU's network). For example, the Remote WTRU 730 may send a Direct Communication Request at 706 to the WTRU-to-Network Relay 740 to establish a PC5 link connection (e.g., step 3). The Direct Communication Request may include the Remote WTRU's 730 power saving capability and/or requirement.

The Remote WTRU 730 may receive a message from the WTRU-to-Network Relay 740. The message may indicate (e.g., include) an Ack that the WTRU-to-Network Relay 740 relays communications between the Remote WTRU 730 and the network 760 (e.g., the Remote WTRU's network). For example, the Remote WTRU 730 may receive a Direct Communication Ack from the WTRU-to-Network Relay 740 at 708 (e.g., step 4). The Direct Communication Ack message at 708 may include WTRU-to-Network Relay's 740 power saving capability.

The Remote WTRU 730 may decide whether to enable one or more power saving feature(s) with the network 760 at 710 (e.g., step 5). A Remote WTRU 730 may determine if power saving capability(ies) should be enabled considering, for example, the Relay's capability(ies). For example, the Remote WTRU 730 may enable a power saving feature with the network if the WTRU-to-Network Relay 740 supports a power saving capability.

The Remote WTRU 730 may negotiate an extended DRX and/or MICO mode during the registration procedure, for example, if the Remote WTRU 730 decides to enable power saving feature. The Remote WTRU 730 may send a message to the Remote WTRU's network 760. The message may indicate (e.g., include) a request that the Remote WTRU 730 transmits communications between the Remote WTRU 730 and the network 760 (e.g., Remote WTRU's network). In some examples, the Remote WTRU may send a Registration Request at 712*a* (e.g., eDRX, MICO) to the network (e.g., Remote WTRU's network). In examples, the Remote WTRU 730 may receive a message from the network 760 (e.g., Remote WTRU's network). The message may indicate (e.g., include) an Accept that the Remote WTRU's network transmits communications between the network (e.g., Remote WTRU's network) and the Remote WTRU 730. For example, the Remote WTRU 730 may receive a Registration Accept at 712*b* (e.g., eDRX, MICO) from the network 760 (e.g., Remote WTRU's network). In examples, the Remote WTRU 730 may enter a CM-Idle mode. In examples, the Remote WTRU may go to power saving mode, and/or enter idle (e.g., CM-Idle) mode, when registration is accepted.

At 713*a*, the Remote WTRU 730 may transmit a message to the RAN 750. The message may indicate that the Remote WTRU is in idle (e.g., CM-Idle) mode. At 713*b*, the RAN 750 may transmit a message to the network 760 (e.g., Remote WTRU's network). At 713*b*, the RAN 750 may receive a message from the network 760 (e.g., Remote WTRU's network). The message may indicate (e.g., include) that the Remote WTRU 730 is in idle (e.g., CM-Idle) mode.

The Remote WTRU 730 may send an indication to the WTRU-to-Network Relay 740 that the Remote WTRU 730 is operating in a power savings mode for the WTRU's communications with the network 760. For example, the Remote WTRU 730 may send a power saving activated indication at 714 to the WTRU-to-Network Relay 740 (e.g., via PC5 signaling) (e.g., step 8). A PC5 message (e.g., new PC5 message) may be used for this purpose (e.g., Link Mode Update Request with power saving ON/OFF as parameters and/or the Link Modification Request may be modified to include "modify power saving mode" and/or "ON/OFF"). The Remote WTRU 730 may inform the WTRU-to-NW Relay 740 that power saving is activated.

The WTRU-to-Network Relay 740 may adjust/pause/stop maintenance (e.g., keep-alive) timers based on the indication at 716 (e.g., step 9). The WTRU-to-NW Relay 740 and/or Remote WTRU 730 may adjust the respective PC5 maintenance timers. In examples, the Remote WTRU 730 (e.g., Link Mode Up-date Ack and/or Link Modification Accept) may receive an Ack at 718 from the WTRU-to-Network Relay 740. For example, the Remote WTRU 730 may receive a power saving activated Ack from the WTRU-to-Network Relay 740. The Remote WTRU 730 may adjust, pause, and/or stop maintenance timers at 720 based on, for example, the indication. For example, the Remote WTRU 730 may adjust and/or stop a sidelink maintenance timer associated with sidelink communications between the WTRU 730 and relay WTRU 740 based on sending the indication.

Embodiments relating to secure power saving policy negotiation during PC5 link establishment between Remote WTRU and WTRU-to-Network Relay may be described herein.

In some embodiments, the Remote WTRU and/or WTRU-to-Network Relay may perform secure power saving policy negotiation based on, for example, provisioned authorized power saving policies associated with a Relay Service Code (RSC) and/or a Remote WTRU's power saving parameters (e.g., MICO/eDRX) accepted from the network.

Figure 8:
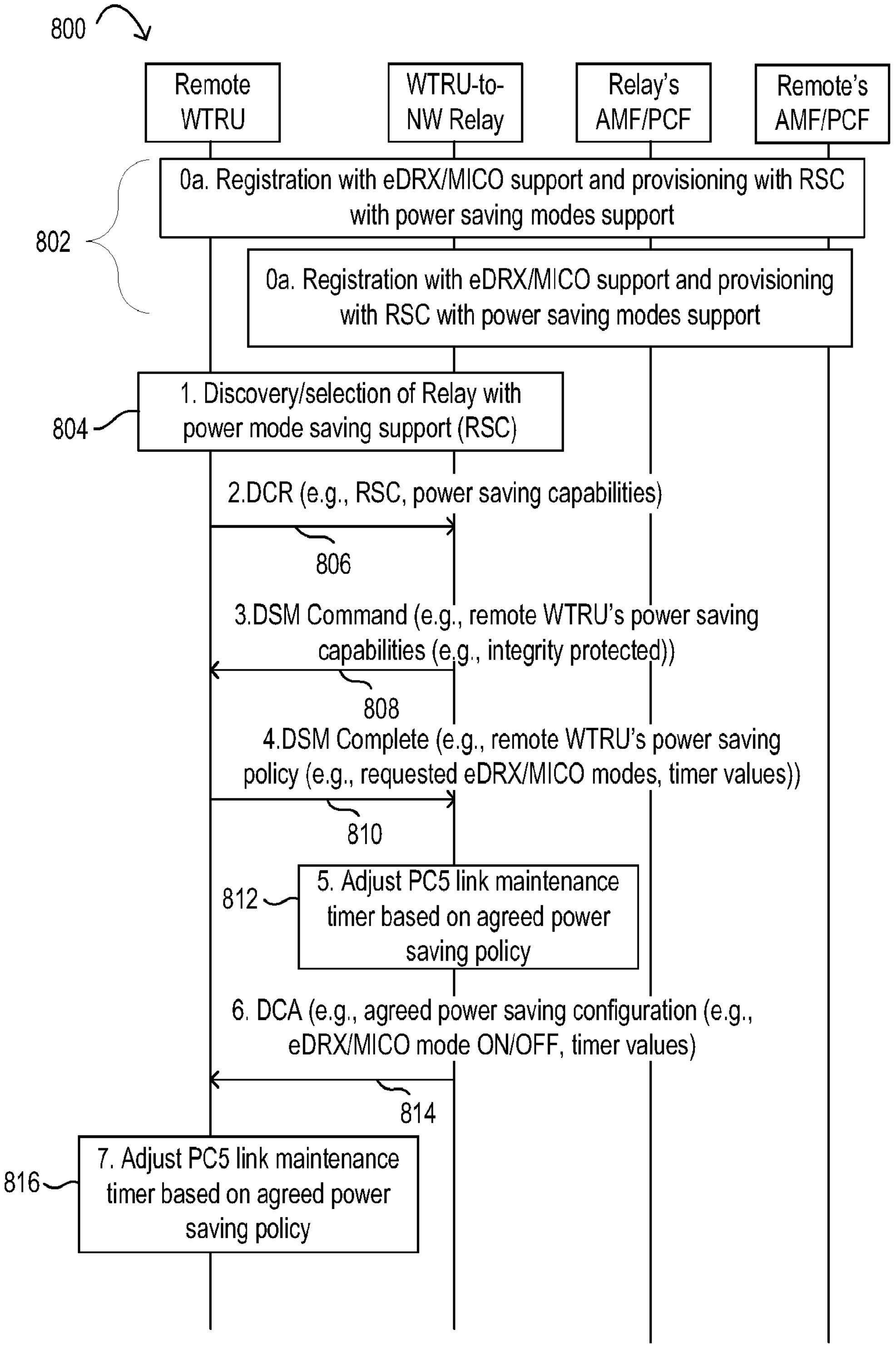
FIG. 8 illustrates an example of secure power saving policy negotiation as may be performed during PC5 link establishment.

FIG. 8 illustrates an example of secure power saving policy negotiation as may be performed during PC5 link establishment. The Remote WTRU and/or WTRU-to-Network Relay may be provisioned with a Relay Service Code (RSC) associated with an authorized power saving policy at 802. The power saving policy may include supported power saving modes parameters (e.g., for DRX and/or MICO). The power saving policy may include acceptable values for the power saving timers (e.g., min/max range of timer values). The provisioning of RSC with associated power saving parameters may be obtained during a Registration procedure (e.g., from a PCF). The network allowed/accepted parameters for MICO/eDRX (e.g., eDRX and/or MICO mode accepted, allowed timer(s) values) may be obtained during a Registration (e.g., from an AMF).

At 804 (e.g., during discovery), the Remote WTRU may select a WTRU-to-Network Relay that provides a relay service for that RSC. The Remote WTRU may be select the WTRU-to-Network Relay based on power saving requirements, e.g., that is allowed by the network for MICO and/or eDRX and/or provisioned with an RSC with support for corresponding power saving requirements. For example, the Remote WTRU may select a WTRU-to-Network Relay on the condition that the relay broadcasts the RSC associated with a power saving policy that supports MICO and/or eDRX, with the appropriate timer range values.

At 806, the Remote WTRU may send to the WTRU-to-Network Relay a DCR message including the requested RSC and/or Remote WTRU power saving capabilities. The power saving capabilities may indicate whether the Remote WTRU supports MICO and/or eDRX modes.

If the Remote WTRU's DCR is accepted, the WTRU-to-Network Relay WTRU may send a Direct Security Mode (DSM) Command message to the Remote WTRU at 808. The DSM Command message may include, for example, the Remote WTRU power saving capabilities received in the DCR. The DSM Command message may be integrity-protected to prevent, for example, a "man in the middle attack" during the power saving policy negotiation (e.g., injection of invalid power saving modes and/or timer values).

The Remote WTRU may send an indication of its power saving policy in a Direct Security Mode (DSM) complete message at 810. The power saving policy may indicate any of the following: the requested power saving modes (MICO/eDRX) and/or power saving timer values. The DSM complete message may be integrity and/or confidentiality-protected. The confidentiality protection may be used to mitigate potential tracking of the Remote WTRU based on recognizable transmission patterns. The transmission patterns may be derived by a passive attacker, for example, by intercepting the agreed power saving timers when transmitted in the clear.

The WTRU-to-Network Relay WTRU may verify that the received power saving policy is compatible with the power saving policy associated with the requested RSC provisioned for the WTRU-to-Network Relay WTRU. For example, the received power saving policy may be determined as compatible if the MICO/eDRX modes requested by Remote WTRU are supported by the WTRU-to-Network Relay (e.g., according to the WTRU-to-Network Relay WTRU's provisioned power saving policy). In examples, the received power saving policy may be determined as compatible, for example, if the MICO/eDRX requested timer values are within a range of acceptable timer values according to the WTRU-to-Network Relay WTRU's provisioned power saving policy. The WTRU-to-Network Relay WTRU may proceed with the PC5 link establishment and/or reject the connection request with the appropriate code (e.g., power saving mode/timer value not supported), for example, if the WTRU-to-Network Relay WTRU determines that Remote WTRU requested power saving requirements are acceptable. The WTRU-to-Network Relay WTRU may store the agreed power saving configuration with the PC5 link context and/or activate the power saving configuration at 812 for example, by updating the maintenance timers accordingly. For example, the WTRU-to-Network Relay WTRU may adjust a PC5 link maintenance timer based on agreed power saving policy.

The WTRU-to-Network Relay WTRU may send to the Remote WTRU an indication of the power saving configuration based on the agreed power saving policy in a DCA message at 814. The DCA message may be protected (e.g., fully protected) (e.g., via integrity and/or confidentiality protection), for example, as provided by the procedures described herein.

At 816, the Remote WTRU may adjust a timer (e.g., adjust a PC5 link maintenance timer) based on the agreed power saving policy. In examples, the Remote WTRU may store the power saving configuration with the PC5 link context and/or activate the power saving configuration accordingly, for example, when the Remote WTRU receives a DCA message including the agreed power saving configuration from WTRU-to-Network Relay WTRU.

In examples, the Remote WTRU and WTRU-to-Network Relay WTRU may exchange PC5 link messages (e.g., PC5 link maintenance messages) according to the saved PC5 link power saving configuration, for example, after the procedure.

The power saving parameters of the Remote WTRU may be updated by the network (e.g., in coverage), for example, while the Remote WTRU has an active connection with the WTRU-to-Network Relay WTRU. In examples, the Remote WTRU may initiate a Link Modification procedure (e.g., according to current power saving timers) to request new power saving modes/timer values. The WTRU-to-Network Relay WTRU may accept the Link Modification request, for example, if the new requested power saving policy is compatible with the current WTRU-to-Network Relay WTRU's provisioned power saving policy. In examples, the WTRU-to-Network Relay WTRU may store/activate the new power saving configuration accordingly. Otherwise, the WTRU-to-Network Relay WTRU may reject the Link Modification request with the appropriate code (e.g., power saving mode/timer value not supported).

Various embodiments directed to power saving for the WTRU-to-Network Relay may be described herein. The solutions proposed herein may address one or more of the problems described herein.

In embodiments, the WTRU-to-Network Relay may broadcast/send information indicating available DRX cycles and/or available time windows during the discovery procedure (e.g., in an Announcement message and/or Solicitation Response). The Available DRX cycle may indicate the minimum DRX cycle supported by the WTRU-to-Network Relay for monitoring the paging. The Available time windows may indicate the time windows that may be used for data/signaling forwarding. The Remote WTRU may select a WTRU-to-Network Relay based on the extended DRX and/or Available time windows and/or local application requirements.

In embodiments, the Remote WTRU may select a WTRU-to-Network Relay based on Available DRX cycle and/or Available time windows and/or local application requirements. For example, if a local application requirement for DRX cycle is 20.48 s, the Remote WTRU may select a WTRU-to-Network Relay with an available DRX cycle equal to or less than 20.48 s. In some examples, the Remote WTRU may select a WTRU-to-Network Relay with Available time windows covering the first minute of every hour, for example, if local application requires sending/receiving data at a first minute of every hour.

In embodiments, the Remote WTRU may schedule data delivery based on the available time windows.

In embodiments, the Remote WTRU may send Available time windows to the Remote WTRU's network. The Remote WTRU's Network may schedule downlink data delivery based on Available time windows.

In embodiments, the Remote WTRU may send requested time windows and/or a requested DRX to the WTRU-to-Network Relay during the PC5 link establishment procedure.

In embodiments, the WTRU-to-Network Relay may reject the DCR message (e.g., send in a Direct Communication Ack message) indicating that the WTRU-to-Network Relay may be unable to fulfil the power saving requirement received in the DCR message.

In embodiments, the WTRU-to-Network Relay may update Available DRX cycle and/or Available time windows and/or may notify the Remote WTRU, for example, after a PC5 connection is established, e.g., by a PC5 Link Modification procedure. The Remote WTRU may reselect a WTRU-to-Network relay.

A WTRU-to-Network relay's behavior according to one or more embodiments may be described herein.

A WTRU-to-Network relay may broadcast Available DRX cycle and/or Available time windows during a discovery procedure. Additionally or alternatively, the relay WTRU may broadcast a Relay power savings mode (e.g., power saving mode 1, power saving mode 2 and/or power saving mode 3). The relay WTRU may receive one or more policy(ies) from the network and/or, for example, based on the policy(ies), broadcast the modes. The power saving modes broadcasted by the relay WTRU may map to and/or correspond to Available DRX cycle and/or Available time window parameters.

In examples, the WTRU-to-Network relay may receive requested DRX cycle and/or requested available time windows during PC5 link establishment procedure and/or in one or more Solicitation Requests.

In examples, the WTRU-to-Network relay may send Available DRX cycle and/or Available time windows in one or more DCA messages or Solicitation Response messages. Alternatively or additionally, the WTRU-to-Network relay may send Agreed DRX cycle and/or Agreed time windows in one or more DCA messages 814 and/or Solicitation Response messages.

In embodiments, a WTRU-to-Network relay may monitor paging and/or forwarding data based on requested DRX cycles and/or requested available time windows and/or Agreed DRX cycle and/or Agreed time windows.

A Remote WTRU's behavior according to one or more embodiments may be described herein. A Remote WTRU may receive a WTRU-to-Network Relay's Available DRX cycle and/or Available time windows during discovery procedure. A Remote WTRU may receive the power saving mode, for example, from the relay WTRU broadcast. The Remote WTRU may be provisioned with the mapping of the power saving mode to the corresponding Available DRX cycle and/or Available time windows parameters. The Remote WTRU may translate the power saving mode into the parameters to select the relay WTRU.

A Remote WTRU may select a WTRU-to-Network Relay based on Available DRX cycle and/or Available time windows. The Remote WTRU may, optionally, send requested DRX cycle and/or requested time windows to WTRU-to-Network relay during PC5 link establishment procedure;

A Remote WTRU may (e.g., optionally) receive confirmation from the WTRU-to-Network Relay about Requested DRX cycle and/or requested time windows (e.g., Agreed DRX cycle and/or Agreed time windows), for example, during PC5 link establishment procedure.

The Remote WTRU may (e.g., optionally) send Agreed time windows and/or Requested time windows and/or available time windows to a Remote WTRU's network, for example, during Registration procedure. The Remote WTRU may schedule data delivery, for example, based on the Agreed time windows and/or Requested time windows and/or available time windows.

Figure 9:
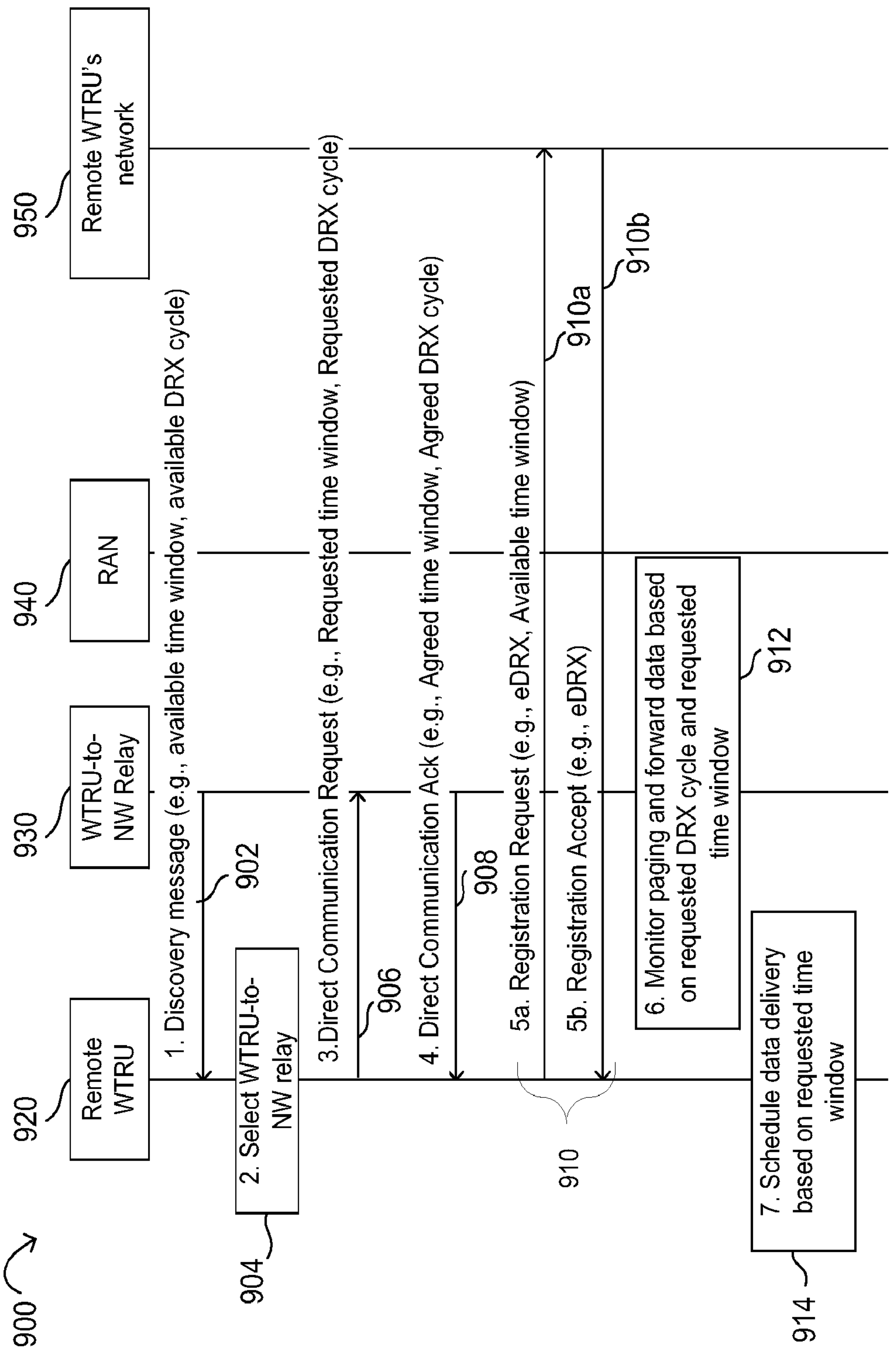
FIG. 9 illustrates an example procedure for power saving for the WTRU-to-Network Relay according to some embodiments.

FIG. 9 illustrates an example procedure for power saving for the WTRU-to-Network Relay according to some embodiments. The overall procedure may be described herein.

At 902, a WTRU-to-Network Relay 930 may send a message to the Remote WTRU 920. The message may indicate (e.g., include) a discovery message (e.g., Available time windows and/or Available DRX cycle). The Remote WTRU 920 may select a WTRU-to-Network Relay 930 at 904, for example, based on WTRU-to-Network Relay's 930 Available time windows and/or Available DRX cycle.

The Remote WTRU 920 may send a message to the WTRU-to-NW Relay 930 at 906. The message may indicate (e.g., include) a request that the WTRU-to-Network Relay 930 relays communications between the Remote WTRU 920 and the network 950 (e.g., Remote WTRU's network). For example, the Remote WTRU 920 may send a Direct Communication Request to establish a PC5 link connection, which may include Requested time windows and/or a Requested DRX cycle.

The Remote WTRU 920 may receive a message from the WTRU-to-Network Relay 930 at 908. The message may indicate (e.g., include) an Ack that the WTRU-to-Network Relay 930 relays communications between the Remote WTRU 920 and the network 950 (e.g., the Remote WTRU's network). For example, the Remote WTRU 920 may receive a Direct Communication Ack at 908 from the WTRU-to-Network Relay 930. The Direct Communication Ack message at 908 may indicate (e.g., include) confirmation about Requested time windows and/or Requested DRX cycle.

The Remote WTRU 920 may send a message to the Remote WTRU's network. The message may indicate (e.g., include) a Registration Procedure. The Registration procedure may indicate (e.g., include) a request that the network (e.g., Remote WTRU's network) transmits communications between the Remote WTRU 920 and the network 950 (e.g., Remote WTRU's network). In examples, the Remote WTRU 920 may send a Registration Request at 910*a* (e.g., eDRX, Available time windows) to the network 950 (e.g., Remote WTRU's network). In examples, the Remote WTRU 920 may provide available time windows and/or requested time windows and/or available time windows to a network 950 (e.g., Remote WTRU's network), for example, during a Registration procedure (e.g., at 910*a* and/or 910*b*). In examples, the Remote WTRU 920 may receive a message from the network 950 (e.g., Remote WTRU's network). The message may indicate (e.g., include) an Accept that the network 950 (e.g., Remote WTRU's network) transmits communications between the network and the Remote WTRU 920. For example, the Remote WTRU 920 may receive a Registration Accept (e.g., eDRX) from the network 760 (e.g., Remote WTRU's network) at 910*b*.

The WTRU-to-Network Relay 930 may monitor paging at 912 based on, for example, a requested DRX cycle and/or forward data based on requested time windows. The Remote WTRU 920 may schedule data delivery at 914 based on, for example, the requested time windows.

Layer 2 (L2) WTRU-to-Network relay DRX cycle alignment may be performed (e.g., as described herein). The Remote WTRU may provide the remote WTRU's DRX cycle and/or the time window information to the relay WTRU to align the transmission, (e.g., via the L2 WTRU-to-Network relay). The Remote WTRU may establish a connection with the network (e.g., via 5G ProSe L2 WTRU-to-Network relay). The Remote WTRU may receive DRX cycle information from the network. The DRX cycle information may be transmitted (e.g., transmitted transparently) to the relay (e.g., the DRX cycle between the Remote WTRU and the network may not be known to the relay WTRU during the transmission). The Remote WTRU may send the DRX cycle information for the PC5 connection between the Remote WTRU and the WTRU-to-Network relay WTRU, and/or the WTRU-to-Network relay WTRU may be aligned with the DRX cycle between the WTRU-to-Network relay WTRU and the network.

FIG. 10 illustrates an example of Layer 2 WTRU-to-Network Relay discontinuous reception (DRX) cycle alignment. A Remote WTRU 1020 may establish a connection to a network 1050 (e.g., Remote WTRU's network) at 1002. In examples, a Remote WTRU 1020 may receive a message from the network 1050 (e.g., Remote WTRU's network). The message may indicate (e.g., include) one or more DRX cycle(s) and/or time window(s) from the network 1050 (e.g., Remote WTRU's network) (e.g., via RRC signaling and/or core network), for example, after the Remote WTRU 1020 has established a connection with a L2 WTRU-to-Network relay. The Remote WTRU 1020 may receive a DRX cycle update from the network. The information received over the L2 WTRU-to-Network relay may be transparent to the Relay WTRU 1030 (e.g., the relay WTRU 1030 may not know about the one or more DRX cycle(s) received by the Remote WTRU 1020).

At 1004, the Remote WTRU 1020 may compare the one or more DRX cycle(s) and/or time window(s) with previous ones (e.g., if ones were received earlier) from the relay WTRU 1030, for example, as part of the discovery and/or PC5 connection establishment.

The Remote WTRU 1020 may send a message to the WTRU-to-Network Relay 1030 at 1006. The message may indicate (e.g., include) a request that the network (e.g., Remote WTRU's network) transmits communications between the Remote WTRU 1020 and the network 1050 (e.g., Remote WTRU's network). In examples, the Remote WTRU 1020 may send a Link Modification Request to the WTRU-to-Network Relay 1030, for example, if the Remote WTRU 1020 determines that one of the DRX cycle(s) matches the available ones from the relay WTRU. The request may indicate (e.g., include) a Link Modification to select the matched cycle(s) as a preferred DRX cycle. For example, the preferred DRX cycle may be associated with a given time window of the time window(s) received from the network 1050 (e.g., Remote WTRU's network). Otherwise, the Remote WTRU 1020 may (e.g., immediately) disconnect the PC5 link with the WTRU-to-Network relay 1030 and/or select another relay with the desired DRX cycle(s) available. Additionally or alternatively, the Remote WTRU may refrain from comparing the DRX cycle(s) and/or may refrain from selecting a preferred DRX cycle.

In examples, the Remote WTRU may send a PC5 Link Modification Request message at 1006 to the Relay WTRU 1030, and/or may include the determined preferred DRX cycle (e.g., and/or the time window associated with the preferred DRX cycle), and/or the list of DRX cycle(s) and/or time window(s) as received from the network 1050 (e.g., Remote WTRU's network).

The relay WTRU 1030 may compare the requested DRX cycle(s) and/or time window(s) with the available (e.g., currently available) ones (e.g., because by the time the Remote WTRU has requested a link modification, previously notified DRX cycles may not be available at the relay WTRU) at 1008. The Relay WTRU 1030 may check if the preferred DRX cycle (e.g., if specified by the Remote WTRU 1020) and/or any of the DRX cycle(s) from the list is available among the available (e.g., currently available) DRX cycles at the relay, for example, and/or may select a DRX cycle and/or time window.

The Remote WTRU 1020 may receive a message from the relay WTRU 1030 at 1010. The message may indicate (e.g., include) an Accept message. The Accept message may indicate (e.g., include) a Link Modification Accept (e.g., PC5 Link Modification Accept) message. The Link Modification Accept message may indicate (e.g., include) the selected DRX cycle(s) and/or time window(s).

In examples, the Remote WTRU 1020 may receive a message from the relay WTRU 1030 at 1012, for example, if the relay WTRU does not have any of the DRX cycle(s) available. The message may indicate (e.g., include) a request (e.g., PC5 disconnect/release request). Additionally or alternatively, the Remote WTRU 1020 may send a message to the Relay WTRU 1030. The message may indicate (e.g., include) a PC5 disconnect response at 1012 to the relay, for example, if the relay WTRU 1030 does not have any of the DRX cycle(s) available. Upon disconnection, for example, the Remote WTRU 1020 may initiate relay discovery (e.g., as described herein) to select another relay.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A relay wireless transmit/receive unit (WTRU) comprising:

a processor configured to:

receive a message from a remote WTRU, wherein the message indicates a Relay Service Code (RSC) and one or more power saving capabilities of the remote WTRU;

send a Direct Security Mode (DSM) command message to the remote WTRU;

receive a DSM complete message from the remote WTRU, wherein the DSM complete message indicates a power saving policy of the remote WTRU;

generate power saving configuration based on the power saving policy of the remote WTRU, the RSC, and the one or more power saving capabilities of the remote WTRU;

send the power saving configuration to the remote WTRU, wherein the power saving configuration indicates an agreed upon power saving policy between the remote WTRU and the relay WTRU, and wherein the agreed upon policy is indicative of a power saving policy determined based on a direct exchange of information between the remote WTRU and the relay WTRU; and receive an indication indicating that the remote WTRU has activated the power saving configuration for communication with the relay WTRU.

2. The relay WTRU of claim 1, wherein the message comprises a Direct Communication Request (DCR) message.

3. The relay WTRU of claim 1, wherein the one or more power saving capabilities of the remote WTRU indicate whether the remote WTRU supports a Mobile Initiated Connection Only (MICO) mode or an extended Discontinuous Reception (eDRX) mode.

4. The relay WTRU of claim 1, wherein the DSM command message comprises an indication of the one or more power saving capabilities of the remote WTRU.

5. The relay WTRU of claim 1, wherein the power saving policy indicates a requested power saving mode or one or more power saving timer values, or wherein the exchange of information comprises the requested power saving mode or the one or more power saving timer values.

6. The relay WTRU of claim 5, wherein the requested power saving mode comprises a Mobile Initiated Connection Only (MICO) mode or an extended Discontinuous Reception (eDRX) mode.

7. The relay WTRU of claim 1, wherein the power saving configuration is received in a dynamic channel allocation (DCA) message.

8. The relay WTRU of claim 1, wherein the agreed upon power saving policy comprises an indication that Mobile Initiated Connection Only (MICO) mode or an enhanced Discontinuous Reception (eDRX) mode will be used.

9. The relay WTRU of claim 1, wherein the processor is further configured to:
store the power saving configuration with a PC5 link context.

10. The relay WTRU of claim 9, wherein the processor is further configured to:
exchange one or more PC5 link messages with the remote WTRU according to the stored power saving configuration.

11. The relay WTRU of claim 1, wherein the processor is further configured to:
receive updated power saving parameters from a network; and
initiate a link modification procedure with the remote WTRU to request an updated power saving configuration based on the updated power saving parameters.

12. The relay WTRU of claim 11, wherein the power saving policy indicates an initial power saving mode and an initial power saving timer value;
wherein the updated power saving parameters comprise an updated power saving mode or an updated power saving timer value; and
wherein the processor is further configured to initiate the link modification procedure with the remote WTRU based on the initial power saving mode and the initial power saving timer value.

13. The relay WTRU of claim 11, wherein the DSM command message, the DSM complete message, and the power saving configuration are integrity protected to prevent man-in-the-middle attacks.

14. A method performed by a relay wireless transmit/receive unit (WTRU), the method comprising:
receiving a message from a remote WTRU, wherein the message indicates a Relay Service Code (RSC) and one or more power saving capabilities of the remote WTRU;
sending a Direct Security Mode (DSM) command message to the remote WTRU;
receiving a DSM complete message from the remote WTRU, wherein the DSM complete message indicates a power saving policy of the remote WTRU;
generating power saving configuration based on the power saving policy of the remote WTRU, the RSC, and the one or more power saving capabilities of the remote WTRU;
sending the power saving configuration to the remote WTRU, wherein the power saving configuration indicates an agreed upon power saving policy between the remote WTRU and the relay WTRU, and wherein the agreed upon policy is indicative of a power saving policy determined based on a direct exchange of information between the remote WTRU and the relay WTRU; and
receiving an indication indicating that the remote WTRU has activated the power saving configuration for communication with the relay WTRU.

15. The method of claim 14, wherein the one or more power saving capabilities of the remote WTRU indicate whether the remote WTRU supports a Mobile Initiated Connection Only (MICO) mode or an extended Discontinuous Reception (eDRX) mode.

16. The method of claim 14, wherein the DSM command message comprises an indication of the one or more power saving capabilities of the remote WTRU.

17. The method of claim 14, wherein the power saving policy indicates a requested power saving mode or one or more power saving timer values, wherein the requested power saving mode comprises the MICO mode or the eDRX mode, or wherein the exchange of information comprises the requested power saving mode or the one or more power saving timer values.

18. The method of claim 14, wherein the agreed upon power saving policy comprises an indication that a mobile initiated connection only (MICO) mode or an enhanced discontinuous reception (eDRX) mode will be used.

19. The method of claim 14, further comprising:
storing the power saving configuration with a PC5 link context; and
exchanging one or more PC5 link messages with the relay remote WTRU according to the stored power saving configuration.

20. The method of claim 14, further comprising:
receiving updated power saving parameters from a network; and
initiating a link modification procedure with the remote WTRU to request an updated power saving configuration based on the updated power saving parameters.

* * * * *